(12) United States Patent
Sala

(10) Patent No.: US 6,336,396 B1
(45) Date of Patent: Jan. 8, 2002

(54) APPARATUS FOR DISPENSING PREDETERMINED QUANTITIES OF LIQUID AND/OR PASTY PRODUCTS

(76) Inventor: André Sala, 495 Route du Stade, 74410 Saint Jorioz (FR)

( * ) Notice: Subject to any disclaimer, the term of this patent is extended or adjusted under 35 U.S.C. 154(b) by 0 days.

(21) Appl. No.: 09/623,805

(22) PCT Filed: Mar. 2, 1998

(86) PCT No.: PCT/FR99/00480

§ 371 Date: Sep. 5, 2000

§ 102(e) Date: Sep. 5, 2000

(87) PCT Pub. No.: WO99/44427

PCT Pub. Date: Sep. 10, 1999

(30) Foreign Application Priority Data

Mar. 6, 1998 (FR) .............................................. 98 03026

(51) Int. Cl.[7] .......................... A47J 37/10; B67D 5/32; A21C 5/02; A21B 5/03
(52) U.S. Cl. .......................... 99/423; 99/353; 222/440; 222/441; 222/449; 222/472
(58) Field of Search .......................... 99/352, 353, 355, 99/422, 423, 424, 484; 220/153.09, 162, 324, 440, 441, 448, 449, 450, 470, 472, 518

(56) References Cited

U.S. PATENT DOCUMENTS 3,215,062 A * 11/1965 Frankenberg
4,082,033 A * 4/1978 Fester .......................... 99/406
4,900,247 A * 2/1990 Sigurdsson .................. 425/140
5,645,195 A * 7/1997 Belshaw et al. ......... 222/153.09

FOREIGN PATENT DOCUMENTS

DE 4001082 * 7/1991
EP 0092305 * 10/1983

OTHER PUBLICATIONS

WO 95/20880, Sala, Aug. 10, 1995.*

* cited by examiner

Primary Examiner—Reginald L. Alexander
(74) Attorney, Agent, or Firm—William A. Drucker

(57) ABSTRACT

The invention concerns an apparatus comprising a container (1) closed with a lid (6) storing the product to be dispensed, a cylinder communicating with the container (1) and whereof the bottom is provided with an outlet, a piston (12) traversed by at least one orifice (13), sliding in the cylinder, a check valve (25) mobile between positions opening and closing the orifice (13), said check valve (25) being urged by a spring towards its opening position, a dispensing nozzle communicating with the outlet and provided with a normally closed plug which opens by the effect of the pressure of the product contained in the cylinder, and means for actuating the piston from outside the container (1). The invention is useful for making pancakes.

15 Claims, 2 Drawing Sheets

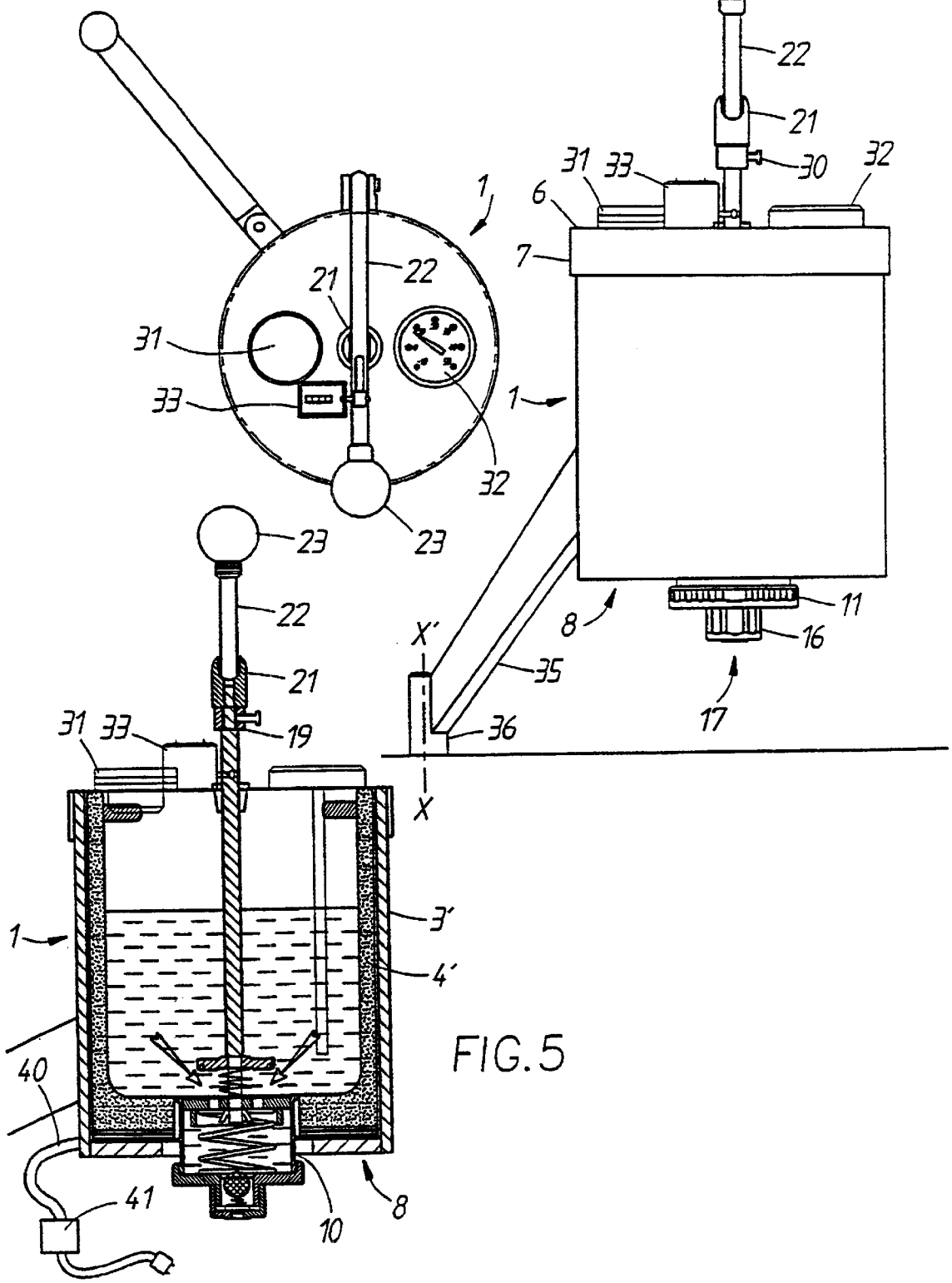

US 6,336,396 B1

APPARATUS FOR DISPENSING PREDETERMINED QUANTITIES OF LIQUID AND/OR PASTY PRODUCTS

BACKGROUND OF THE INVENTION

1. Summary of the Invention

The present invention concerns a device for distributing predetermined quantities of liquid and/or pasty products, as well as an installation for the production of food preparations using said device.

It applies in particular, but not exclusively, to the embodiment of installations for the production of pancakes.

2. Description of the Prior Art

Generally speaking, for this type of application, there are already available installations including:

a horizontal cooking top with one or several cooking plates, a mobile paste distributor above the cooking top so as to be able to lay the dough on the cooking plate(s) and then be moved away from the latter to enable an operator to carry out all the necessary handlings (especially tossing) for cooking the pancakes.

The patent FR No 94 1479 filed in the name of the Applicant concerns a dough distributor including a refrigerated tank whose bottom includes a distribution orifice controlled by an obturator able to be activated by a side handle.

This solution proves to be particularly advantageous and makes it possible to increase the production rates of pancakes whilst reducing to a strict minimum the time required for laying the paste on the cooking plates.

Nevertheless, it does have a certain number of drawbacks the invention seeks to eliminate:

It does not make it possible to accurately apportion the paste quantities laid on the plate. During laying, the operator works on the basis of an evaluation of the amount of paste placed in the plate so as to close the obturator, the opening time needing to be continuously modified according to the amount of paste remaining in the device. Apart from the fact that this evaluation is rough, it has the drawback of not taking into account the quantity of paste which flows after closing of the obturator. This placing operation is thus inaccurate and nevertheless preoccupies all the attention of the operator who cannot at the same time carry out another task (for example monitoring another cooking plate).

After closing, the obturator and the pipe situated downstream of the latter allow paste drips to escape which, owing to the mobility of the measuring device, soils various portions of the cooking plate. The operator thus needs to periodically clean the cooking plate, thus interrupting the pancake production rate For these reasons, the distributor described in said patent Fr is clearly unsuitable when it is associated with other distributors of the same type, for example to allow the operator to select the paste or indeed the distribution of ingredients or accompanying food, such as cream, fondu chocolate, sauce.

OBJECT OF THE INVENTION

So as to eliminate all these drawbacks, the invention concerns a distribution device of said type including:

two superimposed receptacles communicating with each other via an orifice fitted in the at in the bottom of the first receptacle, namely: an upper receptacle closed by a cover and used as a tank for a product to be distributed and a lower smaller receptacle which forms a cylinder whose bottom is provided with outlets;

a piston which slides sealed inside said cylinder between an upper intake position and a bottom end of distribution travel position, this piston being traversed by at least one orifice and being stressed by first elastic means towards its upper intake position;

a mobile clack valve between the opening and closing positions of said orifice, this valve being stressed by second elastic means towards its opening position;

a distribution nozzle communicating with the outlet and provided with an obturator normally closed which opens under the effect of the pressure of the product contained in the cylinder when a thrust of the piston is exerted; and means for activating the piston from outside said receptacles making it possible to successively obtain from an initial state in which the piston is in its upper intake position, the clack valve in an open position and the obturator is in a closed position;

the closing of the clack valve and then the movement of the piston towards its end of distribution travel position with simultaneously opening of the obturator and distribution of the product, immobilisation of the piston at the end of travel with closing of the obturator, opening of the clack valve, then the return of the piston into its upper intake position with simultaneously sucking up of the product contained in the receptacle inside the cylinder.

Advantageously, said activation means could include a rod extending coaxially inside the upper receptacle and whose upper extremity passes through an orifice provided in the cover. The lower portion of this rod passes through two coaxial orifices provided respectively in said clack valve and said piston, stop means integral with the rod being provided to limit the travel of the clack valve in an upper position and the travel of the piston in a bottom position. The elastic means stressing the clack valve to its opening position may then consist of a coaxial helical spring taking support on the piston, the stiffness of this spring being weaker than that of the elastic means stressing the piston to its upper intake position.

The activation of the rod can then be ensured by means of a control lever joined by one extremity onto the upper receptacle and which takes support on the upper extremity of the rod.

BRIEF DESCRIPTION OF THE DRAWINGS

Embodiments of the invention are described hereafter by way of nonrestrictive examples with reference to the accompanying drawings on which:

FIGS. 3 and 4 represent the device seen from the front (FIG. 3) and the top (FIG. 4);

FIG. 5 is a sectional view similar to that of FIGS. 1 and 2 of a distribution device equipped with water bath heating means;

DETAILED DESCRIPTION OF THE PREFERRED EMBODIMENTS

Figure 1:
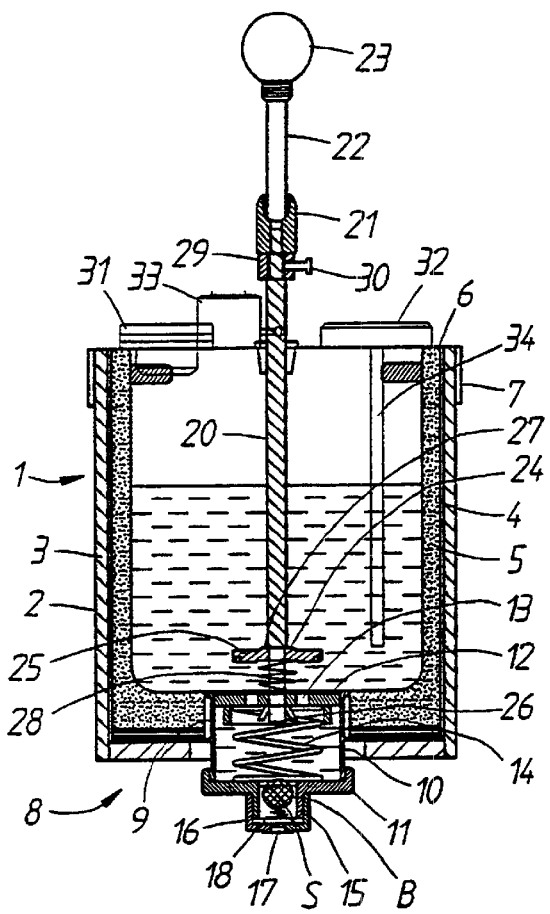
FIGS. 1 and 2 are two axial cutaway views of a device for distributing pancake paste at rest (FIG. 1) and in an end of distribution travel position (FIG. 2)
Figure 2:
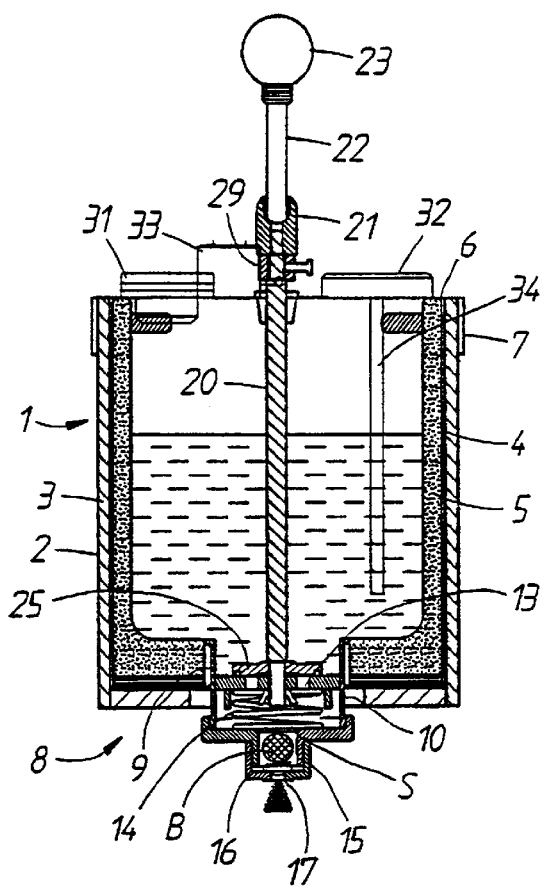

In the example shown on FIGS. 1 and 2, the pancake paste distribution device includes an upper cylindrical receptacle 1 including:

an external cylindrical wall 2 made of aluminum or stainless steel for example whose internal surface is coated with a layer of a thermically nonconducting material 3, such as insulating rubber, and coaxially to said external wall, a movable internal tank 4 with double walls delimiting an inserted volume 5 containing a material such as a cooling gel able to store kilogram calories, this internal tank 4 being used to receive the pancake paste.

The upper portion of the upper receptacle 1 is closed by a circular cover 6 made of aluminium or stainless steel, the edges 7 of said cover returning onto the external face of the external wall 2.

It is closed by a bottom 8 provided with a coaxial cavity 9 passing through the external wall 2, the nonconducting layer 3 and the internal tank 4.

A cylindrical receptacle 10, made of aluminium or stainless steel, is partially nested sealed inside this cavity 9 and is open at its upper portion, its bottom being constituted by a valve support plug 11 screwed onto a threading provided on the external cylindrical wall of said receptacle 10.

This receptacle 10, whose dimensions are much smaller than those of the upper receptacle 1, constitutes a cylinder in which a piston 12 slides with imperviousness provided here by a toric joint equipping the cylindrical skirt of the piston 12.

This piston 12, which has a series of traversing perforations 13 allowing the paste to pass from one receptacle 1 to another 10 is stressed by a helical spring 14 housed in the receptacle 10 and taking support on the plug 11.

This plug 11 includes a central orifice opening into a coaxial cylindrical is sleeve 15 closed by a dummy nut 16 whose bottom is fitted with a coaxial outlet 17.

The central orifice is equipped with an annular seat S on which a ball B is able to come into sealed contact, said ball being stressed by a helical spring 18 housed in the sleeve 15 and taking support on the bottom of the nut 16.

The activation of the piston 12 is ensured by a rod 20 extending coaxially to the receptacle 1 and whose upper portion traverses the cover 6 and ends above the latter by a nut 21 on which a lever 22 comes into support, said lever being joined by one of its extremities to the external wall of the receptacle and bearing a handle 23 at its other extremity.

The lower portion of the rod 20 has a section 24 of smaller diameter passing successively through a central coaxial orifice of a circular clack valve 25 and a central coaxial orifice of the piston 12.

The clack valve 25 and the piston 12 are thus mounted sliding on the section 24. The travel of the piston 12 is limited towards the bottom by a stop constituted here by a wing nut 26 screwed on a threading embodied on the lower extremity of the section 24.

The travel of the clack valve 25 is limited upwards by the horizontal flexure 27 formed between the rod 20 and the section 24.

The piston 12 and the clack valve 25 are stressed towards their respective stops by a helical spring 28 whose stiffness is less than that of the spring 14.

Moreover, the movements of the rod 20 downwards are limited by means of an adjustable annular stop 29 able to move along the portion of the rod 20 which goes beyond the cover 6 and which, at the end of travel downwards, comes into support on the latter. Locking the stop 29 in position on the rod is obtained with the aid of a locking screw 30 screwed into a tapped perforation so as to come into support on the rod 20, thus ensuring locking. The manœuvre of this screw 30 is ensured by means of a knurled head.

Filling of the receptacle 1 is effected by means of an orifice provided in the cover 6 and closed by a stopper 31.

The cover 6 is further equipped with a thermometer 32 whose probe 33 goes fully inside the tank 4, and a conventional counting device 34 counting the manœuvres of the rod 20.

In this example, the distribution device is mounted at the extremity of a bracket 35 whose support is tilted around a vertical axis XX'. The device can then be moved by the operator from one cooking plate to another.

Similarly, the distribution device could be mounted sliding along a rail so as to be able to serve an unlimited number of cooking plates.

The functioning of this device is then the following:

In a preliminary phase, the operator removes the internal tank 5 and places it in a freezer so that it accumulates the amount of kilogram calories required to keep the paste it shall contain at a temperature lower than a specific threshold. Advantageously, this preliminary phase could be carried out at night.

Once this preliminary phase has been completed, the operator reassembles the distribution device and fills the tank 4 with paste via the orifice of the cover 6.

Under the effect of the spring 14, the piston 12 is found in its upper intake position, whereas the clack valve 25 stressed by the spring 28 is in its open position stopped on the bore horizontal flexure 27. The piston 12 further comes to stop and is retained on the wing nut 26. In this position, the paste introduced into the receptacle 1 fills the receptacle 10 by means of the perforations 13. The ball B stressed by the spring blocks off the orifice delimited by the seat S so that the paste remains inside the two receptacles 1, 10.

When the operator wishes to lay out some paste, for example on the cooking plate, he manœuvres the lever 22 so as to move the rod 20 downwards as far as the adjustable stop 29 comes into support on the cover 6. Of course, the travel of the rod 20 which corresponds to the paste portion laid is adjusted as desired by the operator by means of the adjustment of the position of the stop 29 on the rod 20.

In a first fraction of the movement travel towards the bottom of the rod 20, the clack valve 25 is activated via the bottom until it comes into sealed contact on the piston 12 by blocking the perforations 13. During this first travel fraction, the spring 28 is pressed down but does not exert on the piston 13 sufficient force to move it to a large extent owing to the stiffness of the spring 14.

In a second travel fraction of the rod, the piston 12 is driven by the clack valve 25 against the action of the spring 14, the perforations 13 then being sealed off owing to support of the clack valve 25 on the piston 12.

The pressure exerted on the paste by the piston 12 is recovered on the ball B which, by compressing the spring 18 is moved away from the seat S.

The paste can then flow through the sleeve 15 and the orifice 17, as shown on FIG. 2. Flowing of the paste stops at the same time as movement of the rod 20, that is either when the stop 29 has arrived in contact with the cover 6, or on account of a deliberate action of the operator.

In this case, the ball B, which no longer undergoes the pressure of the paste, is pushed back by the spring onto the seat S. Because of this, the flowing of the paste is interrupted, whereas the amount of paste remaining in the sleeve 15 stays captive under the effect of surface tension and the atmospheric pressure. Owing to this, the resultant problem of paste drops falling onto the cooking plate during handlings of the device is resolved.

When the operator releases the handle 23, the clack valve 25 kept on the staging 27 of the rod 20 by the spring 28 accompanies the movement of the rod 20 upwards. At the same time, the piston 12 moves up under the effect of the spring 14 and/or the wing nut 26.

When it moves upwards, the clack valve is lifted up by the spring 28 and the paste contained in the receptacle is sucked up into the lower receptacle through the perforations 13.

At the end of intake travel (position shown on FIG. 1), the receptacle 10 is again filled with paste and the device is ready for a new manoeuvre.

By virtue of the material contained in the movable lower tank, the paste contained in the receptacle 1 stays inside a predetermined temperature range guaranteeing its preservation.

The invention is not limited to the embodiment previously described in a case where the product to be distributed needs to remain at a temperature greater than ambient temperature, which is the case for example of fondu chocolate, the nonconducting layer of material 3 could be replaced by a layer including heating means and/or means for retaining the product at a temperature exceeding ambient temperature.

Thus, in the example shown on FIG. 5, the layer 3 has been replaced by a heating rubber layer 3' fed with power by an electric power circuit 40 able to be connected to the sector and including a thermostat 41. In this case, it is possible to use a tank 4' similar to the tank 4, the gel then surprisingly playing the role of a water bath.

Figure 6:
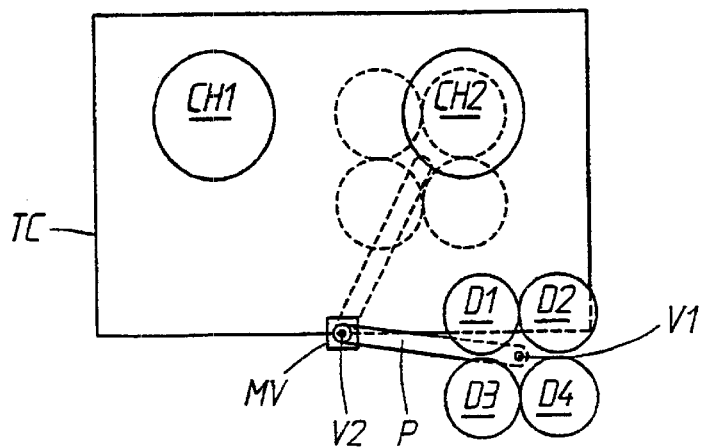
FIG. 6 diagrammatically represents an installation making use of several distribution devices arranged according to a barrel configuration.

One important advantage of the devices described above consists of the fact that owing to their aptitude for delivering cold or hot products and concerning their ergonomics, they are integrated in installations, such as the one diagrammatically shown on FIG. 6 which includes four distributors $D_1$ to $D_4$ assembled side by side in the way of a barrel. This set of distributors $D_1$ to $D_4$ is mounted pivoting around a vertical axis $V_1$ at the extremity of a bracket P whose other extremity pivots around a vertical axis $V_2$ borne by a fixed structure, such as a vertical stanchion, MV, so as to be able to move above a cooking plate TC including in this instance two heating plates $CH_1$, $CH_2$.

The pivotings provided at the extremities of the bracket P may include a catching system facilitating the centering of the distributors $D_1$ to $D_4$ on the heating plates $CH_1$, $CH_2$.

By means of these arrangements, the operator is able to choose between several paste compositions (for example containing wheat or buckwheat) and/or several types of garnishings (fondu chocolate, cream).

This result is obtained with an increased production capacity (possibility of increasing production rates) and with improved product quality (homogeneity of hygiene production).

Of course, in an industrial version, the device could include a hydraulic or pneumatic activator for controlling movements of the rod of the distributors.

Similarly, the sets of distributors could be mounted sliding along a rail so as to be able to be moved above a unspecified number of heating plates.

What is claimed is:

1. Device for distributing predetermined quantities of liquid and/or pasty products, this device including:
   a) two superimposed receptacles integral with each other and communicating with each other via an orifice fitted at the bottom of the first receptacle, namely: an upper receptacle closed by a cover and used as a tank for the product to be distributed, and a lower smaller receptacle constituting a cylinder whose bottom is provided with an outlet;
   b) a piston which slides sealed inside said cylinder between an upper intake position and a bottom distribution end of travel position, this piston being traversed by at least one orifice and stressed by first elastic means towards its upper intake position, including:
   c) a clack valve integral with a rod for activating the piston and mobile between the opening and closing positions of said orifice, this clack valve being stressed by second elastic means towards its opening position;
   d) a distribution nozzle in communication with the cylinder via an orifice equipped with a sealing seat against which an obturator, normally kept in a closed position, is housed in said nozzle under the effect of a spring, and
   e) means for activating the rod from outside said receptacles making it possible to successively obtain from an initial state where the piston is in the upper intake position, the clack valve in its open position and the obturator in its closed position;
      the closing of the clack valve then the movement of the piston towards its distribution end of travel position with at the same time opening of the obturator and distribution of the product, immobilisation of the piston at the end of travel with closing of the obturator, opening of the clack valve, then
      the return on the piston into its upper intake position with simultaneously sucking up of the product contained in the receptacle inside the cylinder.

2. Device according to claim 1, wherein said activation means include a rod extending coaxially inside the upper receptacle and whose upper extremity passes through an orifice provided in the cover.

3. Device according to claim 2, wherein the lower portion of said rod passes through two coaxial orifices respectively provided in said clack valve and in said piston, stop means integral with the rod being provided so as to limit the travel of the clack valve in the upper position and the travel of the piston in the lower position.

4. Device according to claim 1, wherein the elastic means stressing the clack valve towards its opening position consist of a coaxial helical spring taking support on the piston, this spring having a stiffness weaker than that of the elastic means stressing the piston towards its upper intake position.

5. Device according to claim 2, wherein the activation of the rod is then ensured via a control lever joined by one extremity to the upper receptacle and which takes support on the upper extremity of the rod.

6. Device according to claim 1, wherein said upper receptacle includes an external cylindrical wall containing a movable internal tank with double walls delimiting an inserted volume containing a material such as a cooling gel.

7. Device according to claim 6, wherein external wall has an internal surface coated with a layer of a thermically nonconducting material such as insulating rubber.

8. Device according to claim 6, wherein said external wall has an internal surface coated with a layer incorporating heating means fed by a feed circuit with electric power including a thermostat, the material contained between the two walls of the internal tank playing the role of a water bath.

9. Device according to claim 6, wherein the material contained between the two walls of the movable internal tank is a cooling gel, this gel being used to either store kilogram calories or for embodying a water bath.

10. Device according to claim 1, wherein the bottom of the lower receptacle is constituted by a glass support stopper on which a spring takes support, said spring constituting said first elastic means.

11. Device according to claim 10, wherein said stopper includes a central orifice opening into a coaxial cylindrical sleeve closed by a dummy nut whose bottom is fitted with a coaxial outlet said central orifice being equipped with an annular seat on which a ball, stressed by a helical spring housed in the sleeve and taking support on the bottom of the nut, is able to come into sealed contact.

12. Device according to claim 2, wherein the movements of the rod downwards are limited by an adjustable annular stop mobile along the portion of the rod which projects above the cover and which at the end of travel towards the bottom comes into support on the latter.

13. Device according to claim 4, wherein said cover includes a filling orifice closed by a stopper, as well as a thermometer and/or counting device counting the manœuvres of the rod.

14. Installation for producing pancakes or similar products, including a set of distribution devices claim 1, assembled side by side in the way of a barrel, this set being mounted pivoting around a vertical axis at the extremity of a bracket whose other extremity pivots around a fixed vertical axis so as to be able to move above a cooking device including one or several heating plates.

15. Installation for producing pancakes or similar products, including a set of distribution devices claim 1, assembled side by side in the way of a barrel, this set being mounted sliding on a rail so as to move above a cooking device including one or several heating plates.

\* \* \* \* \*